United States Patent [19]

Olah et al.

[11] Patent Number: 5,060,273

[45] Date of Patent: Oct. 22, 1991

[54] SOUND MIXING PROCESSOR, METHOD AND SYSTEM

[75] Inventors: Laszlo Olah, Dallas, Tex.; Frank Nagy, Budapest, Hungary

[73] Assignee: Lester Audio Laboratories, Inc., Dallas, Tex.

[21] Appl. No.: 419,827

[22] Filed: Oct. 11, 1989

[51] Int. Cl.[5] .......... H04B 1/00

[52] U.S. Cl. .......... 381/119; 370/124

[58] Field of Search .......... 381/1, 119, 2; 370/71, 370/76, 85.1, 124

[56] References Cited

U.S. PATENT DOCUMENTS

| | | | |
|---|---|---|---|
| 4,876,719 | 10/1989 | Nakagami et al. | 381/1 |
| 4,922,536 | 5/1990 | Hoque | 381/80 |

*Primary Examiner*—Forester W. Isen

*Attorney, Agent, or Firm*—Johnson & Gibbs

[57] ABSTRACT

A sound mixer processor and related system and methods employs an fiber optic line; optical interfacing means; and, in some embodiments, logic circuitry to contol and monitor multiple input and output allocations.

7 Claims, 2 Drawing Sheets

SOUND MIXING PROCESSOR, METHOD AND SYSTEM

BACKGROUND OF THE INVENTION

1. Field of the Invention

The present invention relates generally to equipment for processing audio signals and, more particularly, to sound multiplexer processors and related systems.

2. Description of the Related Art

There are a multitude of situations where it is necessary or desirable to generate audio signals in one location and to process those audio signals in a second, distant location. At rock concerts, for example, audio signals from microphones and instruments are frequently generated on a stage and then transmitted to sound mixing means several hundred feet away. Other similar such situations include broadcast arrangements at television and radio stations, film shooting situations, and various theater, concert and hotel ballroom performances.

In the above-mentioned and similar situations there are a number of types of audio signal generating equipment. This audio signal generating equipment can comprise microphones and musical instruments, as mentioned above, as well as amplifiers, control signal generating equipment, and on-stage headsets. In an average size commercial show, television broadcast, radio broadcast or concert, the audio signal generating equipment used generally produces twenty to forty separate audio signals. These twenty to forty separate audio signals are the signals that need to be transmitted to a sound mixer where they can be manipulated by an audio engineer.

Heretofore, transmission of the twenty to forty separate audio signals generated at a site remote from a mixer have been transmitted to the mixer via a thick, rigid and heavy coil of cables known as a "snake". The snake comprises a number of separate cables equal to the number of separate audio signals generated, that is, generally, twenty to forty separate cables. The separate cables that make up the snake are typically wound tightly together and plugs are installed on both ends, which plugs facilitate connection to the various audio signal generating equipment at the site and to the sound mixer at its remote location.

Because of the size and weight of the snake, it has been necessary heretofore to simply lay it on the ground or floor between the site and mixer locations. That is, the size and weight of typical snakes preclude hanging them on elevated structures or on walls where they would not be susceptible to being stepped on or kicked. Thus, heretofore, snakes have had to be overly long in order to be routed away from an audience (as the mixer is usually positioned in or behind the audience so as to provide quality feedback to the audio engineer performing the sound mixing) or the snakes have had to be positioned where they are extremely likely to be stepped on or kicked by people in the audience. Even when efforts have been made to route the snake away from an audience, it has been virtually impossible to remove it completely from areas where persons might travel. Thus, heretofore, snakes have been extremely susceptible to damage and to causing injury (for example, to a person tripping over the snake). Additionally, excessively long (and expensive) snakes have had to be employed to attempt to avoid damage to the snakes or injury to persons travelling around and/or over the snakes.

Yet another problem that has heretofore arisen with respect to systems including snakes relates to replugging that has been required to meet the audio engineer's desires and/or requirements. For example, some audio engineers like the microphone controls located on the right side of the mixer; other audio engineers prefer the same controls on the left side. During shows and performances it is necessary that each control be readily known by the audio engineer; thus, considerable effort before the show must be expended in physical plugging and replugging to meet the audio engineer's individual requirements. Even when those requirements are met, the prior art sadly lacks means for instantly verifying that the connections are made in a certain manner, which a audio engineer could find reassuring and/or otherwise helpful. Additionally, of course, replacement audio engineers are forced to expend a large amount of time learning and perhaps also physically modifying an in-place system if, for example, they are employed after a first audio engineer did the system set-up.

SUMMARY OF THE INVENTION

The present invention overcomes the above-mentioned deficiencies and shortcomings of the prior art by providing a sound mixer processor including optical cable means for transmitting audio signals between a site and a remote sound mixer location.

According to the teachings of the present invention a sound mixer processor includes means for receiving at least one audio signal from at least one optical cable and means for processing the received at last one audio signal to render it suitable for receipt by a sound mixer.

Stated further, according to the teachings of the present invention, an apparatus for processing audio signals includes means for receiving audio signal input from at least one fiber optic cable and means for providing output signals to a sound mixer.

A system according to the present invention, which system includes a sound mixer processor, comprises an audio signal transmitter, an audio signal receiver, and an optical fiber interconnecting the audio signal transmitter and the audio signal receiver.

The method according to the present invention includes a step of transmitting audio signals in a suitable form over a fiber optic line.

Accordingly, it is an object of the present invention to provide a sound mixer processor system not requiring use of a snake.

It is a further object of the present invention to provide a sound mixer processor system not likely to be damaged or to cause injury.

Yet another object of the present invention is to provide a sound mixer processor system that does not require replugging during installation.

Still yet another object of the present invention is to provide a high quality sound mixer processor, related system, and method.

BRIEF DESCRIPTION OF THE DRAWINGS

Other objects, advantages and novel features of the present invention will become apparent from the following detailed description of the invention when considered in conjunction with the accompanying drawings wherein.

DESCRIPTION OF PREFERRED EMBODIMENTS

Figure 1:
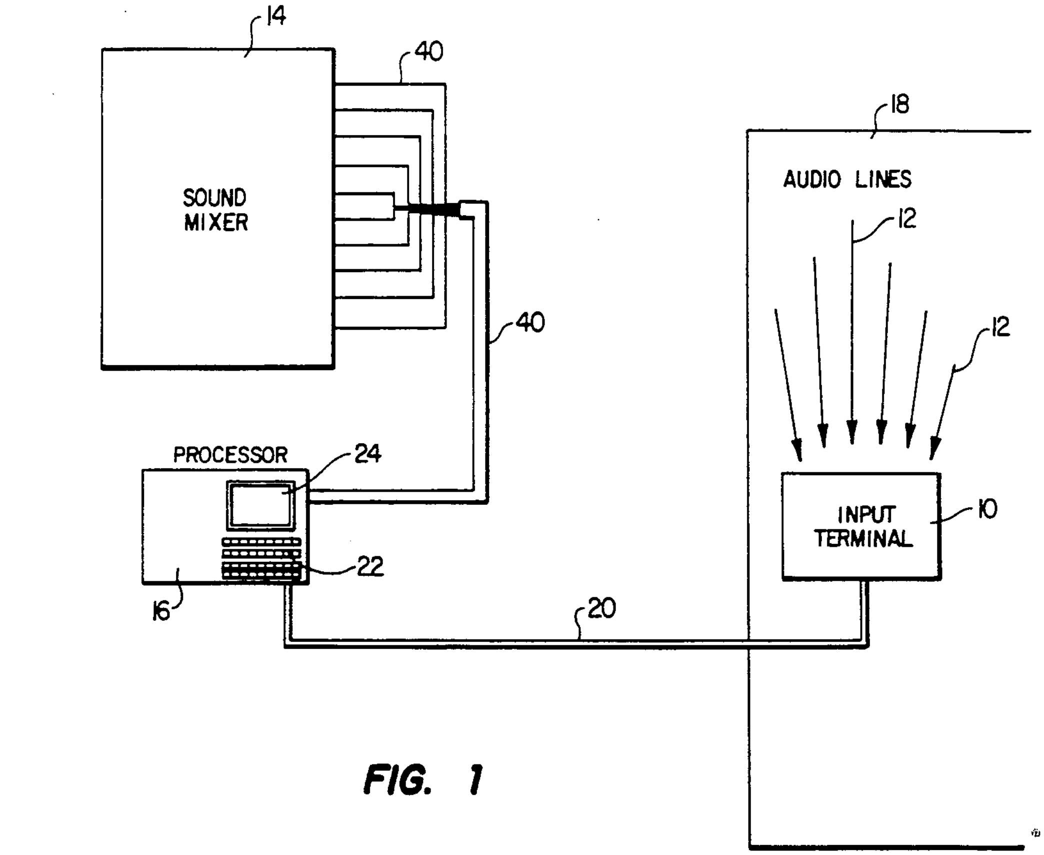
FIG. 1 is a schematic view of a sound mixer processor system according to the teachings of the present invention.

Referring now to the drawings wherein like reference numerals designate the same or similar elements throughout the several views, shown in FIG. 1 is a schematic view of a sound mixer system according to the teachings of the present invention.

In FIG. 1, the working equipment in such a system may be seen to include an input terminal 10 having audio lines 12 leading thereto, a sound mixer 14 and a sound mixer processor 16. The audio lines 12 and input terminal can be seen in FIG. 1 to be positioned at a site 18, which could be, for example, on or near a stage where audio signal generating equipment (not shown) could be operated. Such audio signal generating equipment would be connected to the input terminal 10 via lines 12 in any one of a number of conventional, well-known ways.

Continuing to refer to FIG. 1, input terminal 10 may be seen to be connected to sound mixer processor 16 via a fiber optic line 20. This element of the present invention, that is, fiber optic line 20, effectively replaces the "snake" of the prior art. As conventional fiber optic lines can easily carry twenty to forty separate audio signals in a much smaller diameter than conventional cables, line 20 is much lighter, smaller and more flexible than prior art "snakes". Being smaller and lighter, line 20 can be hung or otherwise positioned so as not to be susceptible over a great portion of its length to interference, and as the cable has a relatively small diameter even those portions that are somehow kicked, stepped upon or brushed against by a person will very likely not cause any sort of injury. Another advantage of an optical fiber line 20 over a snake is that it is less unsightly, which could be an important consideration in situations in which attractive quarters are temporarily modified to allow a performance of some kind to take place therein.

Sound mixer 14 is conventional and well-known to those skilled in the art. Because details of its structure and operation are not important to understanding the present invention, those details are not set forth herein. It should be appreciated, however, that in an overall system according to the present invention, a sound mixer 14 would be controllably connected to a sound mixer processor 16.

The sound mixer processor 16 according to the present invention has a number of important aspects. First, sound mixer processor 16 has means for receiving audio signals transmitted over a fiber optic line. This feature allows a system according to the present invention to include line 20, which results in the advantages mentioned above. Second, sound mixer processor 16 includes a logic unit and associated software which allows allocation and reallocation of channel configurations without requiring physical replugging. Associated with this logic unit is a keyboard 22 and monitor 24 which allow an audio engineer to allocate incoming audio lines from site 18 and which displays the input/output line configuration after programming, respectively. Other features of preferred embodiments of processor 16 include an uninterruptable power supply and a housing that can be received on internationally sized racks.

Figure 3:
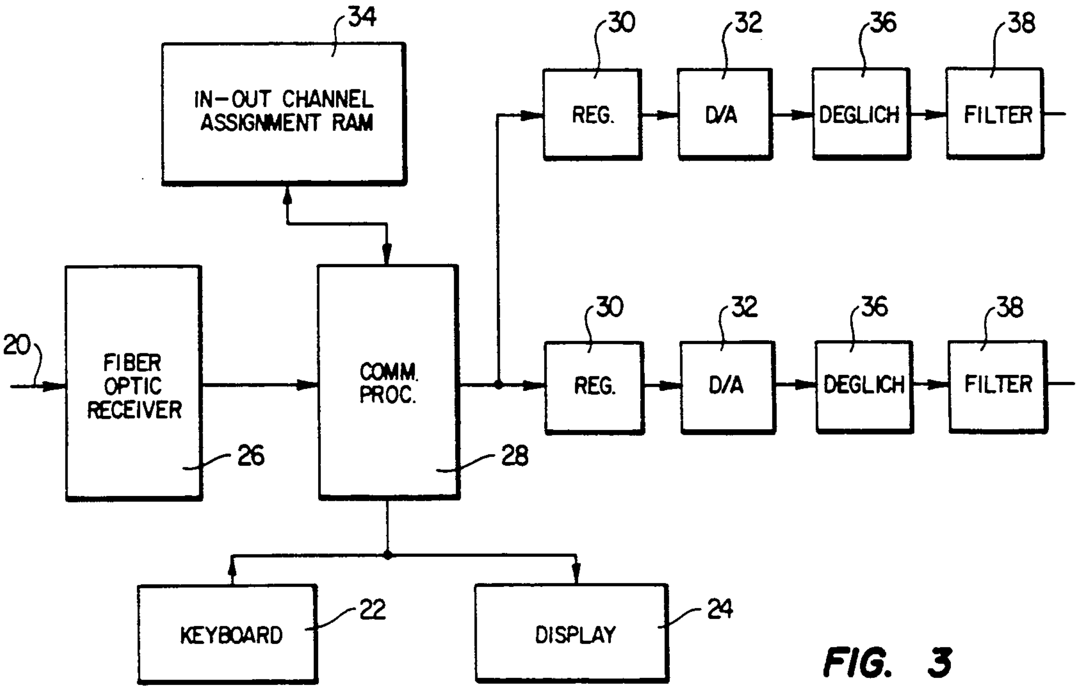
FIG. 3 is a block diagram of a receiver portion of a system according to the teachings of the present invention.

Referring now to FIG. 3, further details regarding sound mixer processor 16 are shown therein. Recognizing that the audio signals received from line 20 are in serial form, a first element in processor 16, fiber optic receiver 26, converts those signals into a parallel form. In that form, the signals pass to communication processor 28. Communication processor 28 performs a number of functions. First, processor 28 controls keyboard 22 and display 24, which elements 22, 24 perform the functions previously discussed. Processor 28 also writes the audio data into the register 30 of an appropriate digital to analog converter 32. As should be appreciated by those skilled in the art, the specific input-output channel assignment is determined by a program stored in random access memory 34 associated with processor 28. Still further, processor 28 controls the deglicheres 36 associated with each converter 32. The deglicheres 36, connected in circuit in the various lines between converters 32 and filters 38, operate in conjunction with the various associated filters 38 to make to output signals (subsequently passed on to mixer 14 via lines 40 as shown in FIG. 1) smooth and free from distortions caused by the glich and nonlinear settling of the converters 32.

By way of example only, the below-identified components, which should be readily recognized by those skilled in the art, are set forth as suitable for employment in embodiments of the present invention:

| ELEMENT | DESIGNATION |
|---|---|
| RAM 34 | MK 48T08 |
| PROCESSOR 28 | TMS 320C25 |
| REGISTERS 30 | MC 374 |
| CONVERTERS 32 | PCM 54 |
| DEGLICHERES 36 | OPA606/MP7512 |
| FILTERS 38 | HAF 0611-7D-TDK |

Figure 2:
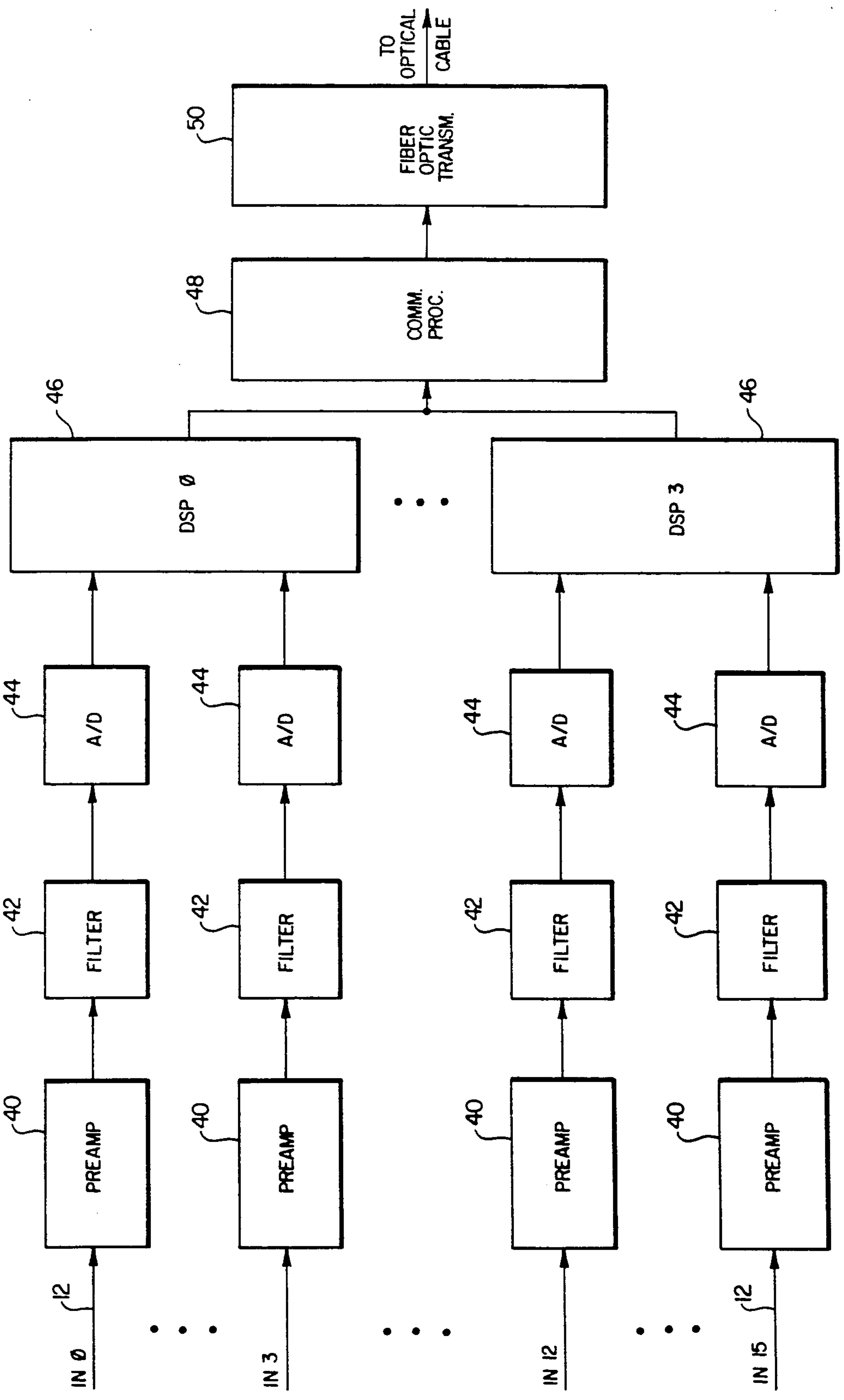
FIG. 2 is block diagram of a transmitter portion of a system according to the teachings of the present invention.

Referring now to FIG. 2, a block diagram showing further details of input terminal 10 is set forth. The various lines 12 can be seen therein to be divided into four groups of channels. For example, an embodiment of the present invention could comprise sixteen total microphone inputs and high level outputs, and each of those sixteen "channels" could be divided into groups as shown. Each group of channels can be seen in FIG. 2 to comprise a preamplifier 40, an antialiasing filter 42, and an analog-to-digital converter 44. As should be appreciated by those skilled in the art, the preamplifiers 40 gain the input signal (coming from, e.g., the microphones) to the level of the converters' 44 input and the antialiasing filters suppress the harmonic components of the input signal to avoid the spectral folding effect that could introduce distortion into the system. As should be further readily apparent to those skilled in the art, the converters 44 take samples of the signals travelling through the various groups of channels and convert those signals into digital form. In an embodiment of the present invention, a sampling frequency could be on the order of 40 KHz. A number of digital signal processors 46 are associated with each group of channels to control the aforementioned sampling process and to process the various digital signals. In embodiments of the present invention, processors 46 may be programmed to implement a finite-duration impulse response (FIR) filter to equalize both the amplitude and phase of the overall system to assure good dynamic characteristics of the microphone mixer. Referring still further to FIG. 2, it can be seen that the output signals of the processors 46 are gathered in a communications processor 48 and then sent through a transmitter 50 (having fiber optic transmission, i.e., parallel to serial, logic).

By way of example only, an embodiment of this part of a system according to the present invention could be constructed using the components designated below, which components should be instantly recognized by those persons skilled in the relevant art:

| ELEMENT | DESIGNATION |
|---|---|
| Filters 42 | HAF 0611-7D-TDK |
| Converters 44 | CS 5014 |
| Processors 46 | TMS320C25 |
| Processor 48 | TMS320C25 |

Based upon use of the various components identified in this application, a preferred embodiment of a system according to the present invention can have features such as sixteen microphone inputs and high outputs, up to 300 feet of fiber optic cable separating the transmitter and receiver, a signal-to-noise ratio of about 93 dB, distortion of about 0.03%, interchannel isolation of about 95 dB, amplitude flatness of about 1%, phase linearity of about 0.5°, and capability to store up to 512 setable input output channel assignments even when the processor 16 is off. An overall system according to the present invention also, significantly, employs a single, small diameter and highly flexible optical cable rather than a large relatively inflexible bundle of a multitude of cables, i.e., a snake.

Based upon all of the foregoing, those skilled in the art should fully appreciate both the inventive aspects of the individual processor 16 and the inventive aspects of a complete system according to the present invention. The overall system comprises input terminal 10, which terminal is located on or near a site to easily receive and handle audio lines 12; a fiber optic cable 120; and a signal mixer processor 16 to control the entire system.

During installation of a system according to the present invention, a technician can plug audio lines 12 into terminal 10 and the processor 16 output lines into the sound mixer's rear board. Then, using the processor 16, an audio engineer can easily dedicate each line between input/output, via software, using keyboard 22. His or her decisions can be examined by using monitor 24.

It is thus believed that the operation and construction of the present invention will be apparent from the foregoing description. While the method, apparatus and system shown and described have been characterized as being preferred it will be obvious that various changes and modifications may be made wherein without departing from the spirit and scope of the invention.

What is claimed is:

1. A sound mixer processor system, said system comprising:

a plurality of input lines for parallel transmission of input signals generated at a plurality of remote locations;

an audio signal transmitter connected to said plurality of parallel input lines, said audio signal transmitter including means for converting said plurality of parallel input signals to a serial input signal;

an audio signal receiver, said audio signal receiver including means for converting said serial input signal into a second plurality of parallel input signals and means for providing multiple allocations of said second plurality of parallel input signals;

an optical fiber interconnecting said audio signal transmitter and said audio signal receiver, said optical fiber transmitting said serial input signal therebetween; and a sound mixer connected to receive said multiple allocations of said second plurality of parallel input signals from said audio signal receiver.

2. A system as recited in claim 1, wherein said audio signal receiver is associated with a signal processing means.

3. A system as recited in claim 1, wherein said means for providing multiple allocations of said second plurality of parallel input signals comprises a keyboard through which an operator can make allocation decisions.

4. A system as recited in claim 3, wherein said means for providing multiple allocations of said second plurality of parallel input signals further comprises a monitor capable of displaying data indicative of allocation statuses.

5. A method of processing audio signals comprising the steps of:

receiving, in parallel, a plurality of audio signals;

serializing said plurality of parallel audio signals;

transmitting said serialized audio signals through an optical fiber; and processing said serialized signals to make them suitable for receipt by sound mixer, said processing step further including the steps of parallelizing said serialized signal into a first allocated set of parallel audio signals and reallocating said serialized signal into a second allocated set of parallel signals.

6. A method as recited in claim 5, wherein said step of reallocating said serialized signal is computer and operator controlled.

7. A sound mixer processor system, said system comprising:

a plurality of input lines for parallel transmission of signals generated at a plurality of remote locations;

an audio signal transmitter connected to said plurality of parallel input lines, said audio signal transmitter including means for converting said plurality of parallel input signals to a serial input signal;

an audio signal receiver, said audio signal receiver including means for converting said serial input signals into a second plurality of parallel input signals;

an optical fiber interconnecting said audio signal transmitter and said audio signal receiver, said optical fiber transmitting said series input signal therebetween;

a sound mixer connected to receive said second plurality of parallel input signals from said audio signal receiver; and means for providing multiple allocations of said second plurality of parallel input signals to said sound mixer.

* * * * *